United States Patent [19]
Sato

[11] Patent Number: 6,088,172
[45] Date of Patent: Jul. 11, 2000

[54] BRIGHT WIDE-ANGLE LENS

[75] Inventor: Kenichi Sato, Ageo, Japan

[73] Assignee: Fuji Photo Optical Co., Ltd., Omiya, Japan

[21] Appl. No.: 09/178,538

[22] Filed: Oct. 26, 1998

[30] Foreign Application Priority Data

Nov. 19, 1997 [JP] Japan ................................... 9-334999

[51] Int. Cl.$^7$ .................................................. G02B 9/60
[52] U.S. Cl. .......................................... 359/770; 359/763
[58] Field of Search .................................. 359/763, 754, 359/756, 755, 745, 746, 749, 750, 751, 752, 753, 770

[56] References Cited

FOREIGN PATENT DOCUMENTS

| | | |
|---|---|---|
| 1-130116 | 5/1989 | Japan . |
| 1-209413 | 8/1989 | Japan . |
| 5-173062 | 7/1993 | Japan . |
| 6-175018 | 6/1994 | Japan . |
| 1255980 | 9/1986 | U.S.S.R. . |

*Primary Examiner*—Hung Xuan Dang
*Attorney, Agent, or Firm*—Arnold International; Bruce Y. Arnold

[57] ABSTRACT

A compact, bright wide-angle lens including at least five lens elements, as follows, in order from the object side: a negative lens element, a positive lens element, a negative lens element, a positive lens element and a negative lens element. The large aperture, wide-angle lens is provided with favorable image formation capability throughout the entire field of view by arranging, as the negative lens element on the extreme object side, a meniscus lens with its concave surface on the object side, the meniscus lens having at least one aspherical surface and satisfying the following condition:

$$-0.9 < (R_1 - R_2)/(R_1 + R_2)$$

where
$R_1$ is the radius of curvature of the surface on the object side of the meniscus lens, and
$R_2$ is the radius of curvature of the surface of the image side of the meniscus lens.

10 Claims, 4 Drawing Sheets

Embodiment 1

Embodiment 2

BRIGHT WIDE-ANGLE LENS

BACKGROUND OF THE INVENTION

In recent years, in conjunction with the rise in demand for a small-scale, light-weight camera with good operability as well as portability, demand for a smaller scale lens having a wide-angle capability and a large aperture has been increasing.

Conventionally, a retro focus type, exchangeable lens for a single-lens reflex camera is known, and in recent years, similar lenses for use with a lens shutter camera such as disclosed in Japanese Laid-Open Patent Application H01-130116 and in Japanese Laid-Open Patent Application H01-209413, have become known. The lenses disclosed in these laid open patent applications are composed of four lens elements, in order from the object side, as follows: a to positive first lens element, a negative second lens element, a positive third lens element, and a negative fourth lens element shaped as a meniscus lens with its concave surface on the object side.

However, it is difficult to achieve a sufficient compactness, wide-angle capability and large aperture while maintaining high quality imaging when using a lens shutter camera having a lens composed of four lens elements as described immediately above.

BRIEF SUMMARY OF THE INVENTION

This invention relates to a bright wide-angle lens and, more specifically, to a lens suitable for use with a compact lens shutter camera that does not require any adjustment for focus. A first object of the present invention is to provide a compact, wide-angle lens having a wide angle of view and a large aperture.

A second object of the invention is to provide such a lens with favorable aberrations by arranging, as the first lens element on the object side, a negative meniscus lens element having at least one aspherical surface and with its concave surface on the object side. At least four additional lens elements are provided having power, in order from the object side, of positive, negative, positive, and negative.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The bright wide-angle lens of the present invention arranges, in order from the object side: a first lens element having a negative meniscus shape with at least one aspherical surface and with its concave surface on the object side; a positive second lens element; a negative third lens element; a positive fourth lens element; and a fifth lens element having a negative meniscus shape with at least one aspherical surface and with its concave surface on the object side. Further, in the present invention, the following Condition (1) is satisfied:

$$-0.9 < (R_1 - R_2)/(R_1 + R_2) \qquad \text{Condition (1)}$$

where,
$R_1$ is the radius of curvature near the optical axis of the surface on the object side of the first lens element, and
$R_2$ is the radius of curvature near the optical axis of the surface on the image side of the first lens element.

With these design criteria, it is possible to realize a bright wide-angle lens that satisfies the demand for a wider angle of view, greater compactness, and a larger aperture. Further, the present invention enables favorable correction of distortion and curvature of image field by arranging, on the extreme object side of the lens, a meniscus lens element with its concave surface on the object side. Furthermore, the present invention favorably corrects for various other aberrations by making at least one surface of the first lens element aspherical.

In addition, by satisfying Condition (1) as described above, it becomes possible to provide a wide-angle lens which has favorable image formation capability throughout the entire field of view, including peripheral areas of the image. In other words, when the value of $(R_1 - R_2)/(R_1 + R_2)$ falls below the lower limit of the Condition (1), then the spherical aberration and the coma generated by the first lens element become too large.

Moreover, it is preferred that the second lens element and the fourth lens element, as described above, be bi-convex in shape and that the third lens element be bi-concave in shape.

Figure 1:
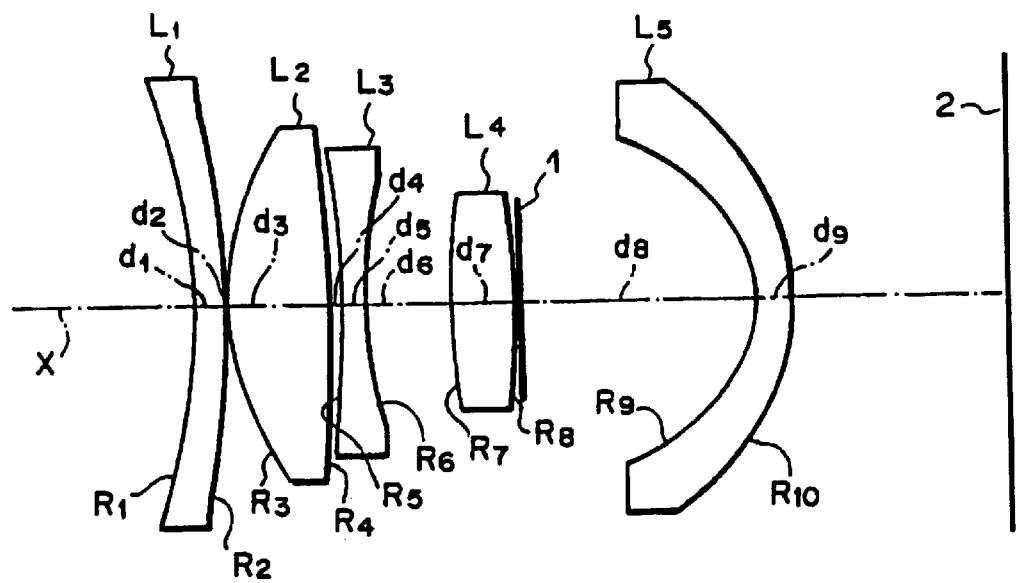
FIG. 1 illustrates the components of the bright wide-angle lens of Embodiment 1 of the present invention.
Figure 2:
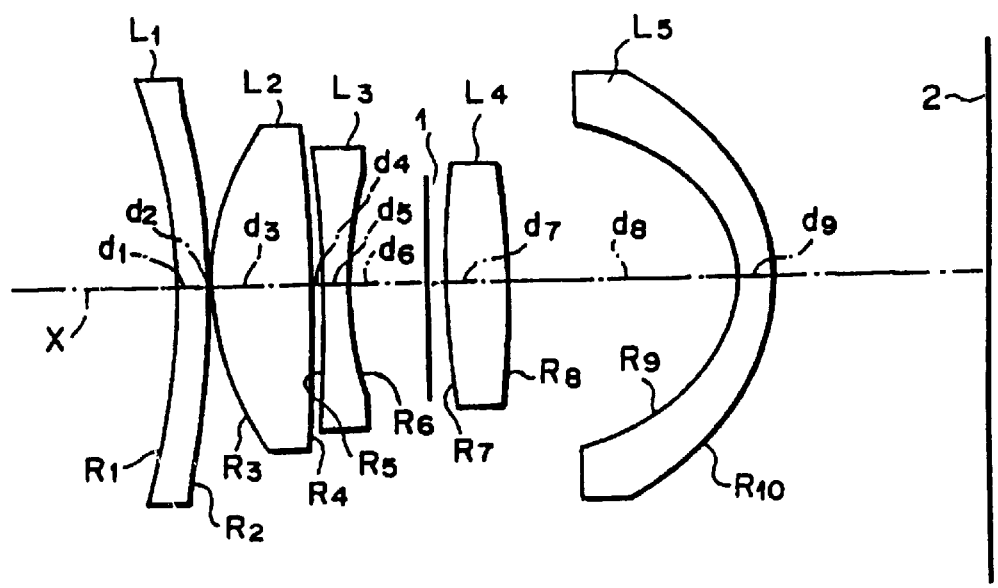
FIG. 2 illustrates the components of the bright wide-angle lens of Embodiments 2 and 3 of the present invention.

FIG. 1 shows the lens composition of the bright wide-angle lens that relates to Embodiment 1, and FIG. 2 shows the lens composition of the bright wide-angle lens that relates to Embodiments 2 and 3. As is apparent from FIG. 1, the shutter diaphragm 1 according to Embodiment 1 is arranged between the fourth lens element $L_4$ and the fifth lens element $L_5$. On the other hand, as shown in FIG. 2, the shutter diaphragm 1 according to Embodiments 2 and 3 is arranged between the third lens element $L_3$ and the fourth lens element $L_4$. In FIGS. 1 and 2, the optical axis is indicated by "x" and the image plane is indicated by "2".

Hereinafter, a detailed explanation of the bright wide-angle lens that relates to Embodiments 1–3, as described above, will be given.

Embodiment 1

Table 1 below lists the surface number #, in order from the object side, the radius of curvature R (in mm) of each lens element surface near the optical axis, the on-axis spacing D (in mm) between each lens element surface, as well as the index of refraction $N_d$ and the Abbe number $V_d$ (at the sodium d line) of each lens element of Embodiment 1. Also, the focal distance f', the f-number $F_{NO}$, and image angle 2ω (i.e. field of view) of the bright wide-angle lens of this embodiment are listed in the lower part of Table 1.

TABLE 1

| # | R | D | $N_d$ | $V_d$ |
|---|---|---|---|---|
| 1* | −22.435 | 1.00 | 1.58913 | 61.2 |
| 2* | −30.472 | 0.10 | | |
| 3 | 10.730 | 3.30 | 1.77250 | 49.6 |
| 4 | −83.201 | 0.32 | | |
| 5 | −45.771 | 0.81 | 1.78471 | 25.7 |
| 6 | 16.247 | 2.79 | | |
| 7 | 29.695 | 2.00 | 1.80501 | 39.6 |
| 8 | −40.261 | 7.62 | | |
| 9* | −5.015 | 1.10 | 1.49023 | 57.5 |
| 10* | −8.229 | | | |
| f' = 23.6 mm | | $F_{NO}$ = 2.65 | 2ω = 71.8° | |

Those surfaces with a * to the right of the surface number in Table 1 are aspherical surfaces, and the aspherical surface shape is expressed by Equation (A) below.

$$Z = Ch^2/\{1+(1-KC^2h^2)^{1/2}\}+A_4h^4+A_6h^6+A_8h^8+A_{10}h^{10} \quad \text{(Equation A)}$$

where

Z is the length (in mm) of a line drawn from a point on the aspherical surface at height h from the optical axis to the tangential plane of the aspherical surface vertex, C (=1/R) is the curvature of the aspherical surface near the optical axis, h is the height (in mm) from the optical axis, K is the eccentricity, and $A_4$, $A_6$, $A_8$, and $A_{10}$ are the 4th, 6th, 8th, and 10th aspherical coefficients.

Table 2, below, lists values of the constants K, $A_4$, $A_6$, $A_8$, and $A_{10}$ in Equation (A) above, for this embodiment.

TABLE 2

| # | K | $A_4$ | $A_6$ | $A_8$ | $A_{10}$ |
|---|---|---|---|---|---|
| 1 | $1.232101 \times 10^0$ | $-1.097335 \times 10^{-4}$ | $3.275809 \times 10^{-6}$ | $-1.028661 \times 10^{-9}$ | $-2.807342 \times 10^{-10}$ |
| 2 | $1.024925 \times 10^0$ | $-4.840651 \times 10^{-5}$ | $2.453583 \times 10^{-6}$ | $2.914140 \times 10^{-8}$ | $-6.199666 \times 10^{-10}$ |
| 9 | $5.389067 \times 10^{-1}$ | $-1.645550 \times 10^{-4}$ | $-4.033511 \times 10^{-6}$ | $-2.632035 \times 10^{-8}$ | $-1.186941 \times 10^{-10}$ |
| 10 | $7.969120 \times 10^{-1}$ | $2.849651 \times 10^{-6}$ | $-7.140121 \times 10^{-6}$ | $4.212446 \times 10^{-8}$ | $1.189653 \times 10^{-11}$ |

As is evident from Table 1, the value of $R_1$ is −22.435, and the value of $R_2$ is −30.472. Thus, the value of $(R_1-R_2)/(R_1+R_2)$ becomes −0.152, which satisfies the above Condition (1).

Embodiment 2

Table 3 below lists the surface number #, in order from the object side, the radius of curvature R (in mm) of each lens element surface near the optical axis, the on-axis spacing D (in mm) between each lens element surface, as well as the index of refraction $N_d$ and the Abbe number $V_d$ (at the sodium d line) of each lens element of Embodiment 2. Also, the focal distance f', the f-number $F_{NO}$, and image angle 2ω of the bright wide-angle lens of this embodiment are listed in the lower part of Table 3.

TABLE 3

| # | R | D | $N_d$ | $V_d$ |
|---|---|---|---|---|
| 1* | −24.346 | 1.01 | 1.58913 | 61.2 |
| 2* | −29.722 | 0.10 | | |
| 3 | 10.577 | 3.30 | 1.77250 | 49.6 |
| 4 | −90.870 | 0.32 | | |
| 5 | −55.707 | 0.88 | 1.78471 | 25.7 |
| 6 | 15.678 | 3.10 | | |
| 7 | 33.185 | 2.00 | 1.80501 | 39.6 |
| 8 | −46.363 | 7.39 | | |
| 9* | −5.004 | 1.10 | 1.49023 | 57.5 |
| 10* | −8.031 | | | |
| f' = 23.6 mm | | $F_{NO}$ = 2.65 | 2ω = 71.8° | |

In addition, Table 4 lists values of the constants K, $A_4$, $A_6$, $A_8$, and $A_{10}$ in Equation (A) above for this embodiment.

TABLE 4

| # | K | $A_4$ | $A_6$ | $A_8$ | $A_{10}$ |
|---|---|---|---|---|---|
| 1 | $1.271733 \times 10^0$ | $-1.310017 \times 10^{-4}$ | $3.424215 \times 10^{-6}$ | $1.363523 \times 10^{-9}$ | $-3.393723 \times 10^{-10}$ |
| 2 | $1.043674 \times 10^0$ | $-6.787058 \times 10^{-5}$ | $2.628002 \times 10^{-6}$ | $2.992716 \times 10^{-8}$ | $-6.705100 \times 10^{-10}$ |
| 9 | $6.099284 \times 10^{-1}$ | $-1.548301 \times 10^{-4}$ | $-4.062651 \times 10^{-6}$ | $-2.405832 \times 10^{-8}$ | $-7.759353 \times 10^{-11}$ |
| 10 | $8.063847 \times 10^{-1}$ | $4.954604 \times 10^{-5}$ | $-1.247562 \times 10^{-6}$ | $3.414053 \times 10^{-8}$ | $1.027912 \times 10^{-10}$ |

As is evident from Table 3, the value of $R_1$ is −24.346, and the value of $R_2$ is −29.722. Thus, the value of $(R_1-R_2)/(R_1+R_2)$ becomes −0.099, and Condition (1) is satisfied for this embodiment.

Embodiment 3

Table 5, below, lists the surface number #, in order from the object side, the radius of curvature R (in mm) of each lens element surface near the optical axis, the on-axis spacing D (in mm) between each lens element surface, as well as the index of refraction $N_d$ and the Abbe number $V_d$ (at the sodium d line) of each lens element of Embodiment 3. Also, the focal distance f, the f-number $F_{NO}$, and image angle 2ω of the bright wide-angle lens of this embodiment are listed in the lower part of Table 5.

TABLE 5

| # | R | D | $N_d$ | $V_d$ |
|---|---|---|---|---|
| 1* | −21.838 | 1.00 | 1.51680 | 64.1 |
| 2* | −26.270 | 0.10 | | |
| 3 | 10.564 | 3.30 | 1.77250 | 49.6 |
| 4 | −95.303 | 0.32 | | |
| 5 | −57.000 | 0.81 | 1.78471 | 25.7 |
| 6 | 15.588 | 3.15 | | |
| 7 | 33.034 | 2.00 | 1.80501 | 39.6 |
| 8 | −47.655 | 7.39 | | |
| 9* | −5.016 | 1.10 | 1.49023 | 57.5 |
| 10* | −7.992 | | | |
| f = 23.6 mm | | $F_{NO}$ = 2.65 | 2ω = 71.8° | |

Table 6 lists values of the coefficients K, $A_4$, $A_6$, $A_8$, and $A_{10}$ in Equation (A), above, for this embodiment.

TABLE 6

| # | K | $A_4$ | $A_6$ | $A_8$ | $A_{10}$ |
|---|---|---|---|---|---|
| 1 | $1.258878 \times 10^0$ | $-1.286995 \times 10^{-4}$ | $3.754987 \times 10^{-6}$ | $-5.714172 \times 10^{-10}$ | $-3.407478 \times 10^{-10}$ |
| 2 | $1.031273 \times 10^0$ | $-5.969693 \times 10^{-5}$ | $2.782567 \times 10^{-6}$ | $3.331902 \times 10^{-8}$ | $-7.266404 \times 10^{-10}$ |
| 9 | $6.063139 \times 10^{-1}$ | $-1.560224 \times 10^{-4}$ | $-4.096215 \times 10^{-6}$ | $-2.393804 \times 10^{-8}$ | $-7.476841 \times 10^{-11}$ |
| 10 | $7.923089 \times 10^{-1}$ | $-4.921330 \times 10^{-5}$ | $-1.204118 \times 10^{-6}$ | $3.382548 \times 10^{-8}$ | $1.068403 \times 10^{-10}$ |

As is evident from Table 5, the value of $R_1$ is −21.838, and the value of $R_2$ is −26.270. Thus, the value of $(R_1-R_2)/(R_1+R_2)$ becomes −0.092 and Condition (1) is satisfied for this embodiment.

Figure 3:
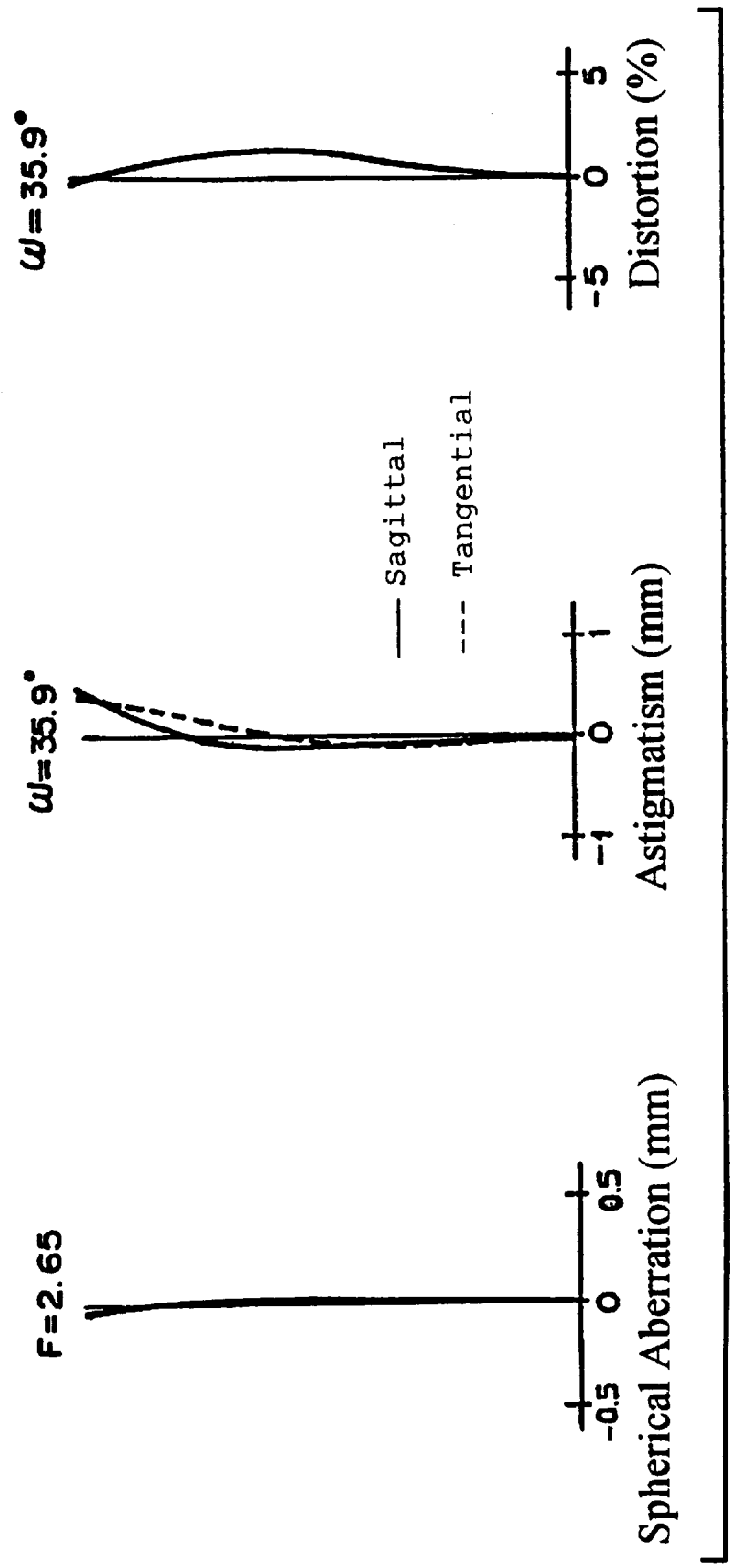
FIG. 3 illustrates the spherical aberration, astigmatism and distortion of the bright wide-angle lens of Embodiment 1.
Figure 4:
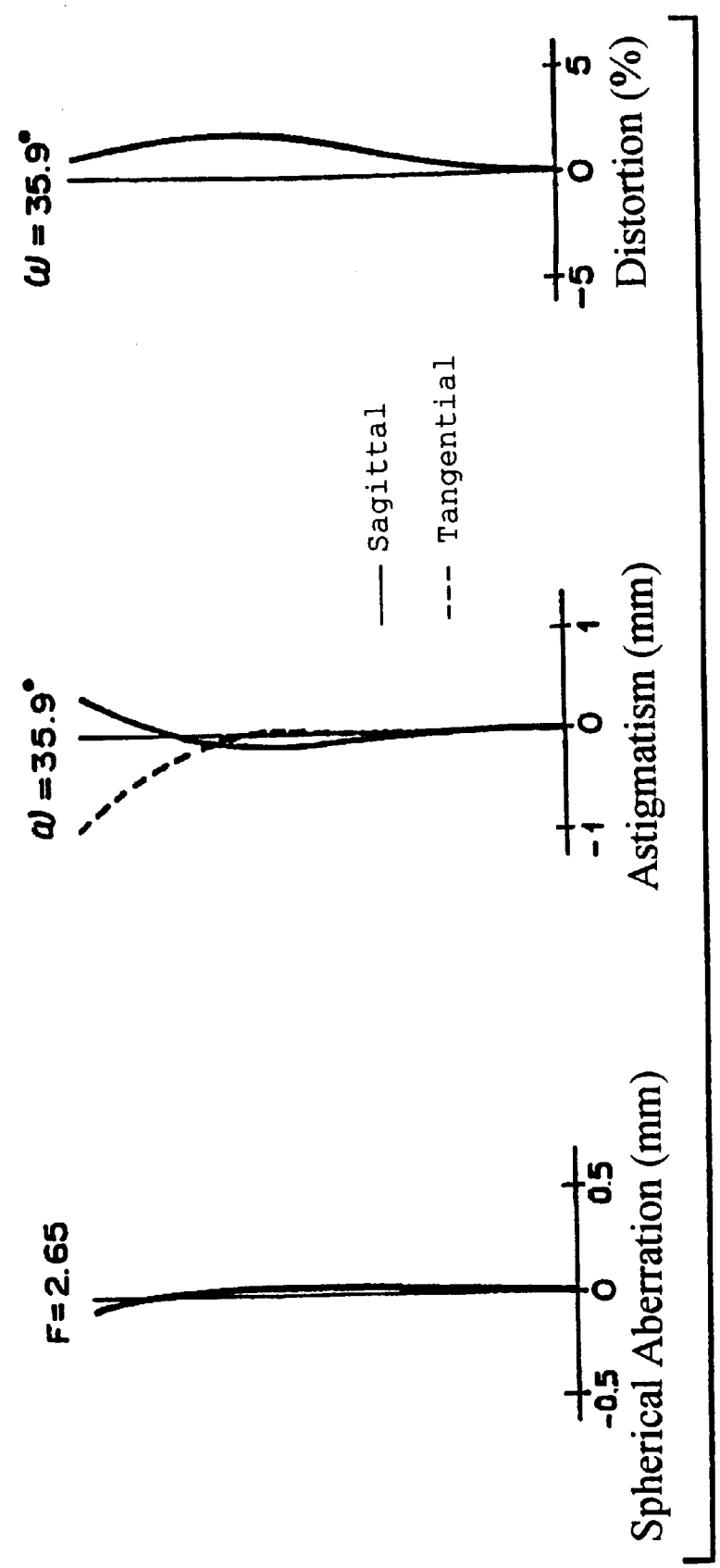
FIG. 4 illustrates the spherical aberration, astigmatism and distortion of the bright wide-angle lens of Embodiment 2.
Figure 5:
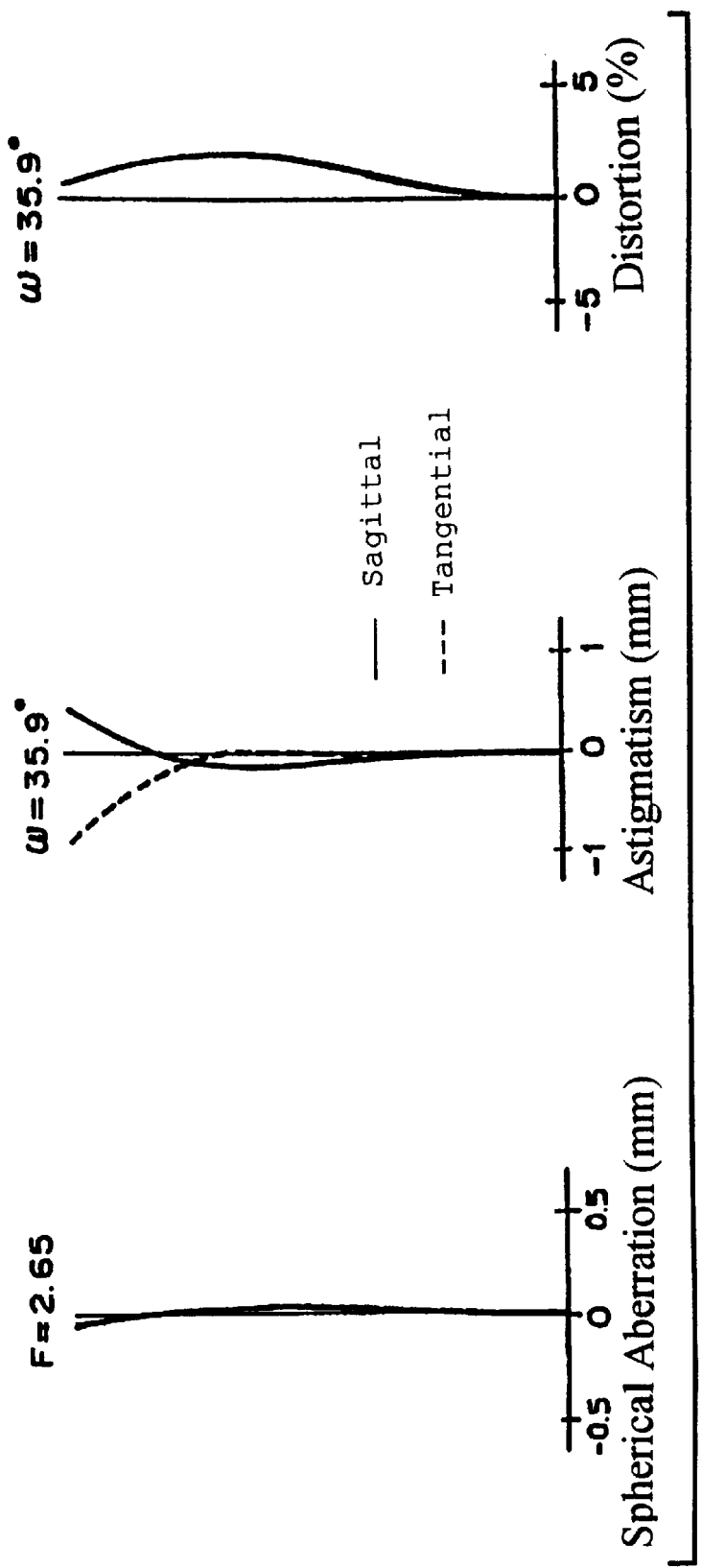
FIG. 5 illustrates the spherical aberration, astigmatism and distortion of the bright wide-angle lens of Embodiment 3.

FIGS. 3 through 5 illustrate the spherical aberration, astigmatism and distortion occurring in Embodiments 1 through 3, respectively. As is evident from these figures, the present invention provides a bright wide-angle lens having acceptably small aberrations while providing a simple construction. Further, according to the present invention, it is possible to provide a bright wide-angle lens having favorable imaging formation throughout the field of view, including peripheral areas of the image, while providing a wider angle of view, larger aperture and more compactness. This is accomplished by employing at least one aspherical surface on the first lens element and by establishing the relationship as set forth in Condition (1) above.

Of course, the bright wide-angle lens of this invention is not to be limited to those specifically illustrated in the various embodiments. Rather the scope of the invention shall be defined as set forth in the following claims and their legal equivalents. Various modifications will occur to those skilled in the art as a result of reading the above description, and all such modifications as would be obvious to one of ordinary skill in the art are intended to be within the spirit of the invention disclosed. For example, the second through fourth lens elements may be shaped as meniscus lens elements.

What is claimed is:

1. A wide-angle lens comprising, in order from the object side, the following lens elements:
   a first lens element of negative meniscus shape having at least one aspherical surface with its concave surface on the object side;
   a second lens element of positive refracting power;
   a third lens element of negative refracting power;
   a fourth lens element of positive refracting power; and,
   a fifth lens element of negative meniscus shape and having at least one aspherical surface with its concave surface on the object side;
   wherein, the following condition is satisfied $-0.9 < (R_1-R_2)/(R_1+R_2)$ where,
   $R_1$ is the radius of curvature near the optical axis of the object side of the first lens element, and
   $R_2$ is the radius of curvature near the optical axis of the image side of the first lens element.

2. The wide-angle lens according to claim 1, wherein the second lens element and the fourth lens element are each bi-convex and the third lens element is bi-concave.

3. The wide-angle lens according to claim 1, wherein both surfaces of the first lens element are aspherical.

4. The wide-angle lens according to claim 3, wherein both surfaces of the fifth lens element are aspherical.

5. The wide-angle lens according to claim 1, wherein the construction parameters are as set forth below:

| # | R | D | $N_d$ | $V_d$ |
|---|---|---|---|---|
| 1 | −22.435 | 1.00 | 1.58913 | 61.2 |
| 2 | −30.472 | 0.10 | | |
| 3 | 10.730 | 3.30 | 1.77250 | 49.6 |
| 4 | −83.201 | 0.32 | | |
| 5 | −45.771 | 0.81 | 1.78471 | 25.7 |
| 6 | 16.247 | 2.79 | | |
| 7 | 29.695 | 2.00 | 1.80501 | 39.6 |
| 8 | −40.261 | 7.62 | | |
| 9 | −5.015 | 1.10 | 1.49023 | 57.5 |
| 10 | −8.229 | | | | where # is the surface number, in order from the object side, R is the radius of curvature (in mm) of each lens element surface near the optical axis, D is the on-axis spacing (in mm) between each lens element surface, $N_d$ is the index of refraction and $V_d$ is the Abbe number at the sodium d line.

6. The wide-angle lens according to claim 5, wherein both surfaces of the first lens element are aspherical.

7. The wide-angle lens according to claim 1, wherein the construction parameters are as set forth below:

| # | R | D | $N_d$ | $V_d$ |
|---|---|---|---|---|
| 1 | −24.346 | 1.01 | 1.58913 | 61.2 |
| 2 | −29.722 | 0.10 | | |
| 3 | 10.577 | 3.30 | 1.77250 | 49.6 |
| 4 | −90.870 | 0.32 | | |
| 5 | −55.707 | 0.88 | 1.78471 | 25.7 |
| 6 | 15.678 | 3.10 | | |

-continued

| # | R | D | $N_d$ | $V_d$ |
|---|---|---|---|---|
| 7 | 33.185 | 2.00 | 1.80501 | 39.6 |
| 8 | −46.363 | 7.39 | | |
| 9 | −5.004 | 1.10 | 1.49023 | 57.5 |
| 10 | −8.031 | | | | where # is the surface number, in order from the object side, R is the radius of curvature (in mm) of each lens element surface near the optical axis, D is the on-axis spacing (in mm) between each lens element surface, $N_d$ is the index of refraction, and $V_d$ is the Abbe number at the sodium d line.

8. The wide-angle lens according to claim 7, wherein both surfaces of the first lens element are aspherical.

9. The wide-angle lens according to claim 1, wherein the construction parameters are as set forth below:

| # | R | D | $N_d$ | $V_d$ |
|---|---|---|---|---|
| 1 | −21.838 | 1.00 | 1.51680 | 64.1 |
| 2 | −26.270 | 0.10 | | |
| 3 | 10.564 | 3.30 | 1.77250 | 49.6 |
| 4 | −95.303 | 0.32 | | |
| 5 | −57.000 | 0.81 | 1.78471 | 25.7 |
| 6 | 15.588 | 3.15 | | |
| 7 | 33.034 | 2.00 | 1.80501 | 39.6 |
| 8 | −47.655 | 7.39 | | |
| 9 | −5.016 | 1.10 | 1.49023 | 57.5 |
| 10 | −7.992 | | | | where # is the surface number, in order from the object side, R is the radius of curvature (in mm) of each lens element surface near the optical axis, D is the on-axis spacing (in mm) between each lens element surface, $N_d$ is the index of refraction, and $V_d$ is the Abbe number at the sodium d line.

10. The wide-angle lens according to claim 9, wherein both surfaces of the first lens element are aspherical.

* * * * *

UNITED STATES PATENT AND TRADEMARK OFFICE
CERTIFICATE OF CORRECTION

PATENT NO : 6,088,172
DATED : Jul. 11, 2000
INVENTOR(S): Sato

It is certified that error appears in the above-identified patent and that said Letters Patent are hereby corrected as shown below:

At col. 1, line 17, change "a to" to -- a --.

Signed and Sealed this

Seventeenth Day of April, 2001

*Attest:*

NICHOLAS P. GODICI

*Attesting Officer*   Acting Director of the United States Patent and Trademark Office